(12) United States Patent
Matsuda et al.

(10) Patent No.: US 10,989,926 B1
(45) Date of Patent: Apr. 27, 2021

(54) POLARIZATION-SELECTIVE DIFFUSIVE COMBINER AND NEAR-EYE DISPLAY BASED THEREON

(71) Applicant: Facebook Technologies, LLC, Menlo Park, CA (US)

(72) Inventors: Nathan Matsuda, Seattle, WA (US); Yusufu Njoni Bamaxam Sulai, Bothell, WA (US); Ying Geng, Bellevue, WA (US); Brian Wheelwright, Sammamish, WA (US); Douglas Robert Lanman, Bellevue, WA (US); Afsoon Jamali, Redmond, WA (US); Jasmine Soria Sears, Redmond, WA (US); Alireza Moheghi, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/579,182

(22) Filed: Sep. 23, 2019

(51) Int. Cl.
  *G02B 27/01* (2006.01)
  *G02B 27/28* (2006.01)
  *G02B 5/02* (2006.01)
  *G02B 5/30* (2006.01)

(52) U.S. Cl.
  CPC ....... *G02B 27/0172* (2013.01); *G02B 27/283* (2013.01); *G02B 5/0205* (2013.01); *G02B 5/30* (2013.01)

(58) Field of Classification Search
  None
  See application file for complete search history.

(56) References Cited

U.S. PATENT DOCUMENTS

| 9,576,398 B1* | 2/2017 | Zehner | G02B 27/0172 |
| 2016/0266389 A1* | 9/2016 | Ouderkirk | G02B 5/30 |
| 2016/0274450 A1* | 9/2016 | Usukura | G02B 5/02 |
| 2017/0227773 A1* | 8/2017 | Aksit | G02B 27/0172 |

OTHER PUBLICATIONS

F. Bloisi et al., Optoelectronic polarizer by PDLC. Liq.Cryst., 20(3), 377 (1996).

* cited by examiner

*Primary Examiner* — Nicholas J Lee
(74) *Attorney, Agent, or Firm* — Pequignot + Myers; Matthew A. Pequignot

(57) ABSTRACT

A near-eye display based on a polarization-selective diffusive combiner includes a polarizer for polarizing impinging ambient light to have a first polarization state, and a polarization-selective scatterer downstream of the polarizer, for passing through the ambient light having the first polarization state substantially without scattering, while scattering impinging display light having a second polarization state orthogonal to the first polarization state. The display light at the second polarization state may be provided by a projector, the polarization-selective scatterer playing the role of a projector screen. A polarization-selective ocular lens may be disposed downstream of the polarization-selective scatterer for viewing images generated by the projector while propagating through orthogonally polarized light from outside environment.

20 Claims, 13 Drawing Sheets

POLARIZATION-SELECTIVE DIFFUSIVE COMBINER AND NEAR-EYE DISPLAY BASED THEREON

TECHNICAL FIELD

The present disclosure relates to wearable headsets, and in particular to components and modules for wearable visual display headsets.

BACKGROUND

Head mounted displays (HMD), helmet mounted displays, near-eye displays (NED), and the like are being increasingly used for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the user's head, a large, bulky, unbalanced, and/or heavy display device would be cumbersome and may be uncomfortable for the user to wear.

Some wearable displays are constructed to enable the viewer observe the outside environment while viewing the generated imagery, text, and other generated content provided by the display. The observed outside environment may visually interfere with the added virtual content, reducing contrast of displayed images, causing eyestrain and confusion to the viewer and, in some cases, rendering the added visual information indiscernible.

BRIEF DESCRIPTION OF THE DRAWINGS

Exemplary embodiments will now be described in conjunction with the drawings, in which.

DETAILED DESCRIPTION

Figure 1A:
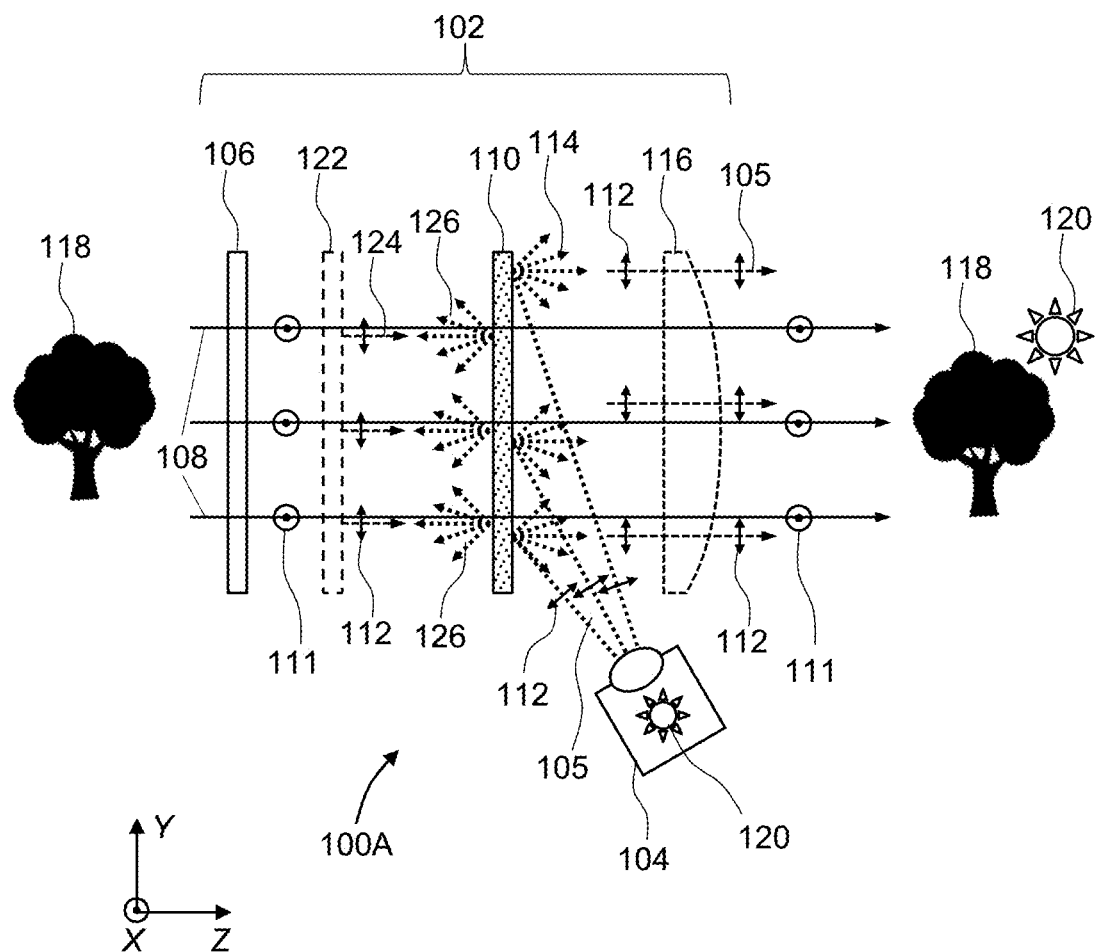
FIG. 1A is a side cross-sectional view of a near-eye display including a projector downstream of a polarization-selective scatterer.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A near-eye display (NED) may be constructed by providing a translucent screen on which an image may be projected, and an ocular lens enabling the projected image to be viewed by an eye. A portion of ambient light may propagate through the translucent screen to enable the viewer to observe the outside world while viewing the projected image. A compensating lens may be provided on the distal side of the display, i.e. on the other side of the translucent screen and on-axis with the ocular lens, to compensate for the focusing effect of the latter when viewing the outside world. Such a configuration, however, may be bulky, complex to build, and may attenuate the outside light too strongly.

In accordance with the present disclosure, a translucent screen may be replaced with a polarization-selective scatterer element, also termed polarization-selective diffuser, configured to propagate light at a first polarization through the diffuser substantially without scattering, while scattering light at a second, orthogonal polarization. A polarizer may be provided upstream of the polarization-selective scatterer element for polarizing impinging ambient light to have the first polarization. The display light projected by a projector onto the polarization-selective scatterer element may have the second polarization for efficient scattering by the diffuser. In some embodiments, the ocular (focusing) lens is made polarization-selective, i.e. the ocular lens may have different focusing powers for light at the first and second polarizations, and may even have zero focusing power for light at the first polarization.

In accordance with the present disclosure, there is provided a polarization-selective diffusive combiner comprising a polarizer for polarizing impinging ambient light to have a first polarization state, and a polarization-selective scatterer downstream of the polarizer, for receiving and propagating therethrough the ambient light having the first polarization state substantially without scattering, while scattering impinging display light having a second polarization state orthogonal to the first polarization state.

In embodiments where the first and second polarization states are orthogonal linear polarization states, the polarization-selective scatterer may include a polymer-stabilized liquid crystal layer comprising liquid crystal molecules dispersed in and aligned by a polymer network extending in a direction perpendicular to a plane of polarization of the first polarization state, whereby the liquid crystal molecules are oriented to have a uniform refractive index for the ambient light having the first polarization state, and a different, spatially varying refractive index for the display light having the second polarization state, for scattering the display light having the second polarization state.

The polarization-selective scatterer may further include first and second transparent electrodes. The polymer-stabilized liquid crystal layer may be disposed between the first and second transparent electrodes for electric control of amount of scattering of the display light by the polymer-stabilized liquid crystal layer.

In some embodiments, the polarization-selective diffusive combiner further comprises a configurable polarization rotator upstream of the polarization-selective scatterer, for changing a polarization state of at least a portion of the impinging ambient light from the first polarization state to the second polarization state. In some embodiments, the polarization-selective diffusive combiner further comprises a focusing element downstream of the polarization-selective scatterer, for forming an image in angular domain from the display light scattered by the polarization-selective scatterer. The focusing element may be configured to form the image in angular domain from the display light having the second polarization state and to transmit the ambient light having the first polarization state substantially without focusing or defocusing. The focusing element may include e.g. a polarization-selective pancake lens. The polarization-selective scatterer may include a Pancharatnam-Berry polymer-stabilized diffuser.

In accordance with the present disclosure, there is provided a near-eye display comprising a polarizer for polarizing impinging ambient light to have a first polarization state; a polarization-selective scatterer downstream of the polarizer, for receiving and propagating therethrough the ambient light polarized by the polarizer substantially without scattering, while scattering impinging display light having a second polarization state orthogonal to the first polarization state; and a projector for providing the display light having the second polarization state, wherein the projector is disposed and configured to form an image in linear domain on the polarization-selective scatterer.

In embodiments where the first and second polarization states are orthogonal linear polarization states, the polarization-selective scatterer may include a polymer-stabilized liquid crystal layer comprising liquid crystal molecules dispersed in and aligned by a polymer network extending in a direction perpendicular to a plane of polarization of the first polarization state, whereby the liquid crystal molecules are oriented to have a uniform refractive index for the ambient light having the first polarization state, and a different, spatially varying refractive index for the display light having the second polarization state, for scattering the display light impinging onto the polarization-selective scatterer. The polarization-selective scatterer may further include first and second transparent electrodes, wherein the polymer-stabilized liquid crystal layer is disposed between the first and second transparent electrodes for electric control of amount of scattering of the display light by the polymer-stabilized liquid crystal layer.

The projector may be disposed downstream or upstream of the polarization-selective scatterer. In some embodiments, the near-eye display further comprises a polarization-selective pancake lens downstream of the polarization-selective scatterer, for forming an image in angular domain from the display light scattered by the polarization-selective scatterer, while transmitting the ambient light having the first polarization state substantially without focusing or defocusing. In some embodiments, the near-eye display further comprises a configurable polarization rotator upstream of the polarization-selective scatterer and downstream of the polarizer, for changing a polarization state of at least a portion of the impinging ambient light from the first polarization state to the second polarization state. The configurable polarization rotator may include an array of polarization rotator elements for changing the polarization state of the impinging ambient light in a spatially-variant manner, to form an occluding area upstream of the image in linear domain on the polarization-selective scatterer.

In some embodiments, the near-eye display further includes an eye tracker for determining at least one of position or orientation of an eye of a user of the near-eye display, and a controller operably coupled to the eye tracker and the array of polarization rotator elements, and configured to use the eye tracker to determine the at least one of the eye position or orientation of the user's eye, and determine parallax of the occluding area corresponding to an occluding region of the image, in accordance with the at least one of the eye position or orientation. The controller may be configured to operate the array of polarization rotator elements to adjust the occluding area to account for the parallax of the occluding area.

In accordance with the present disclosure, there is further provided a near-eye display comprising a first polarizer for polarizing impinging ambient light to have a first polarization state; a configurable polarization rotator downstream of the first polarizer, for changing a polarization state of at least a portion of the impinging ambient light from the first polarization state to a second polarization state orthogonal to the first polarization state; a polarization-selective scatterer downstream of the configurable polarization rotator, for receiving and propagating therethrough a portion of the ambient light having the first polarization state substantially without scattering, while scattering light having the second polarization state; a projector for providing display light having the second polarization state, wherein the projector is disposed downstream of the polarization-selective scatterer and configured to form an image in linear domain on the polarization-selective scatterer; and a focusing element downstream of the polarization-selective scatterer, for forming an image in angular domain from the display light having the second polarization state scattered by the polarization-selective scatterer towards the focusing element, while transmitting the portion of the ambient light having the first polarization state substantially without focusing or defocusing.

The near-eye display may further include a second polarizer downstream of the configurable polarization rotator and upstream of the polarization-selective scatterer, for attenuating the portion of the impinging ambient light having the second polarization state. In some embodiments, the near-eye display also includes an eye tracker for determining at least one of position or orientation of an eye of a user of the near-eye display; a camera for determining angular brightness distribution of the ambient light; and a controller operably coupled to the projector, the configurable polarization rotator, the camera, and the eye tracker. The controller may be configured to use the eye tracker to determine a gaze direction of the user; use the camera to determine ambient light brightness in the gaze direction; operate the configurable polarization rotator to dim the ambient light in accordance with the ambient light brightness in the gaze direction; and operate the projector to provide the display light.

The configurable polarization rotator may include an array of polarization rotator elements for changing the polarization state of the impinging ambient light in a spatially-variant manner, to dim the ambient light in a spatially-variant manner. The near-eye display may further include a camera for determining an angular brightness distribution of the ambient light; and a controller operably coupled to the projector, the configurable polarization rotator, and the camera. The controller may be configured to use the camera to determine the angular brightness distribution of the ambient light; operate the configurable polarization rotator to dim the ambient light in a spatially-variant manner in accordance with the angular brightness distribution of the ambient light; and operate the projector to provide the display light.

Referring now to FIG. 1A, an NED 100A includes a polarization-selective diffusive combiner 102 and an image projector 104 for providing display light 105. The polarization-selective diffusive combiner 102 includes a polarizer 106 for polarizing impinging ambient light 108 to have a first polarization state 111, in this example a linear polarization state with the direction of polarization along X-axis, or in XZ plane. A polarization-selective scatterer 110 is disposed downstream of the polarizer 106. Herein and throughout the rest of the specification, the term "downstream" means in the direction of propagation of the ambient light 108, that is, generally in a direction generally from outside and towards the user of the display. In operation, the polarization-selective scatterer 110 receives and propagates the ambient light 108 having the first polarization state 111 substantially without scattering.

The image projector 104 emits the display light 105, which has a second polarization state 112 orthogonal to the first polarization state 111. In this example, the display light 105 is linearly polarized in YZ plane, i.e. orthogonally polarized w.r.t the ambient light 108. The display light 105 forms a projected image on the polarization-selective scatterer 110. The polarization-selective scatterer 110 scatters the impinging display light 105 having the second polarization state, thus functioning much like a white screen onto which an image is projected by a projector. The image is in linear domain, i.e. it may be directly observed by a viewer from a distance, being a real image on the projector screen. The scattering is symbolically shown with fans of arrows 114 pointing downstream, i.e. to the right in FIG. 1A.

The polarization-selective diffusive combiner 102 may further include a focusing element 116 downstream of the polarization-selective scatterer 110. The focusing element 116 is configured to form an image in angular domain from the display light 105 scattered by the polarization-selective scatterer 110 towards the focusing element 116. In other words, the focusing element 116 functions as an ocular lens, enabling the user to view the image in linear domain formed by scattering the display light 105 by the polarization-selective scatterer 110 from a short distance.

In some embodiments, the focusing element 116 is polarization-selective, i.e. its optical power (focusing power) depends upon the polarization state of impinging light. For example, the focusing element 116 may be configured to form the image in angular domain from the display light 105 having the second polarization state 112 and to transmit the ambient light 108 having the first polarization state 111 substantially without focusing or defocusing. In the example presented in FIG. 1A, the ambient light 108 carries an image of an external object 118 disposed at a distance. The display light 105 emitted by the image projector 104 may include an image of a virtual object 120, which is projected onto the polarization-selective scatterer 110. The polarization-selective scatterer 110 scatters the display light 105 downstream and towards the polarization-selective focusing element 116, which converts the image in linear domain into an image in angular domain, while substantially not redirecting or focusing the ambient light 108. Thus, the polarization-selective diffusive combiner 102 combines the images in angular domain of the external (real) object 118 and the virtual object 120. Images in angular domain may be directly observed by a user's eye. Light carrying the images is cross-polarized: the ambient light 108 is polarized in XZ plane (the first polarization state 111), while the display light 105 is polarized in YZ plane (the second polarization state 112).

In some embodiments, the polarization-selective diffusive combiner 102 may further include a configurable polarization rotator 122 disposed downstream of the polarizer 106 and upstream of the polarization-selective scatterer 110. The configurable polarization rotator 122 may operate to change a polarization state of at least a portion of the impinging ambient light 108 from the first polarization state 111 to the second polarization state 112. For example, the configurable polarization rotator 122 may rotate the first polarization state 111 by an acute angle, causing a portion 124 of the ambient light 108 to have the second polarization state 112, i.e. be polarized along Y-axis or more generally in YZ plane.

By way of a non-limiting example, the configurable polarization rotator 122 may be implemented using liquid crystals. An electrically controlled liquid crystal (LC) cell with a pixelated transparent driving electrode may include a thin layer of a liquid crystal material in a suitable configuration, e.g. a pi-cell, twisted nematic (TN), super-twisted nematic (STN), film-compensated STN (FSTN), fringe-field switching (FFS), in-plane switching (IPS), etc. The transparent electrode(s) of the LC cell may be made e.g. of indium tin oxide (ITO).

The portion 124 may be scattered in a spatially uniform manner or in a spatially selective manner. First, the spatially uniform scattering will be considered. The portion 124 will be scattered by the polarization-selective scatterer 110 such that, for example, a major portion of scattered light 126, or the entire scattered light 126, propagates back towards the polarization-selective scatterer 110. This causes the image of the external object 118 to be dimmed. For spatially non-uniform scattering, the dimming of the ambient light 108 may be spatially selective, enabling certain portions of the outside imagery to be selectively dimmed or attenuated, e.g. to simulate an effect of occlusion by virtual objects concurrently displayed by the image projector 104. The spatially non-uniform scattering may be achieved by configuring the configurable polarization rotator 122 to have an array of polarization rotator elements, e.g. a 2D array of polarization-rotating pixels. The 2D array may extend laterally w.r.t. impinging light, e.g. in XY plane, for changing the polarization state of the impinging ambient light 108 in a spatially-variant manner. This enables the pixelated configurable polarization rotator 122 to form an occluding area upstream of the image in linear domain on the polarization-selective scatterer 110. The dimming and occlusion functions will be considered in more detail further below.

Figure 1B:
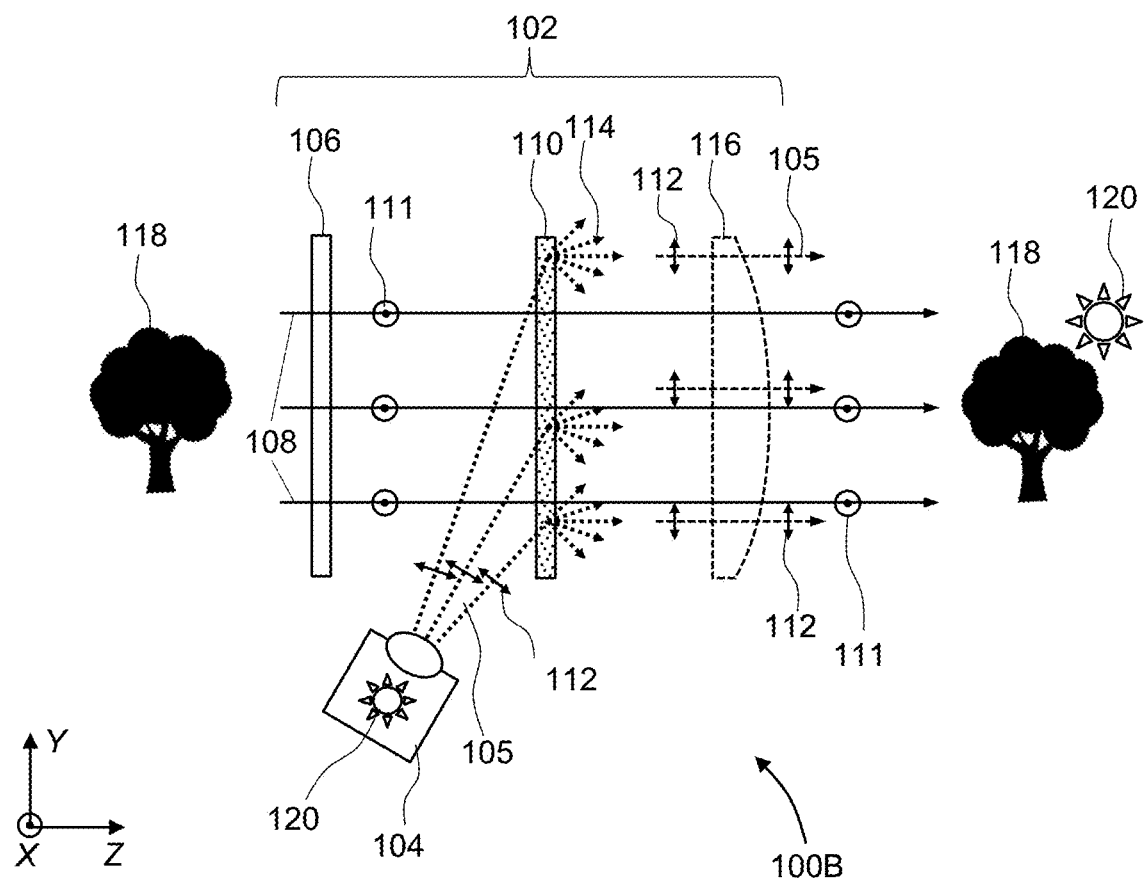
FIG. 1B is a side cross-sectional view of a near-eye display including a projector upstream of a polarization-selective scatterer.

Referring to FIG. 1B, an NED 100B is a variant of the NED 100A of FIG. 1A, and includes similar elements. In the embodiment shown in FIG. 1B, the NED 100B has the image projector 104 disposed not downstream but upstream of the polarization-selective scatterer 110, which in this embodiment is configured to scatter the display light 105 in the downstream direction, i.e. towards through the polarization-selective scatterer 110 and towards the polarization-selective focusing element 116. The direction of light scattering may be a function of the thickness and scatterer density of the polarization-selective focusing element 116, for example. Thick and/or dense polarization-selective focusing element 116 may scatter light mostly in backward direction, while thin and/or sparsely scattering the polarization-selective focusing element 116 may scatter light mostly in forward direction. Furthermore in some embodiments, two polarization-selective focusing elements 116 may be provided, one for scattering in forward direction and one for scattering in backward direction.

Figure 2A:
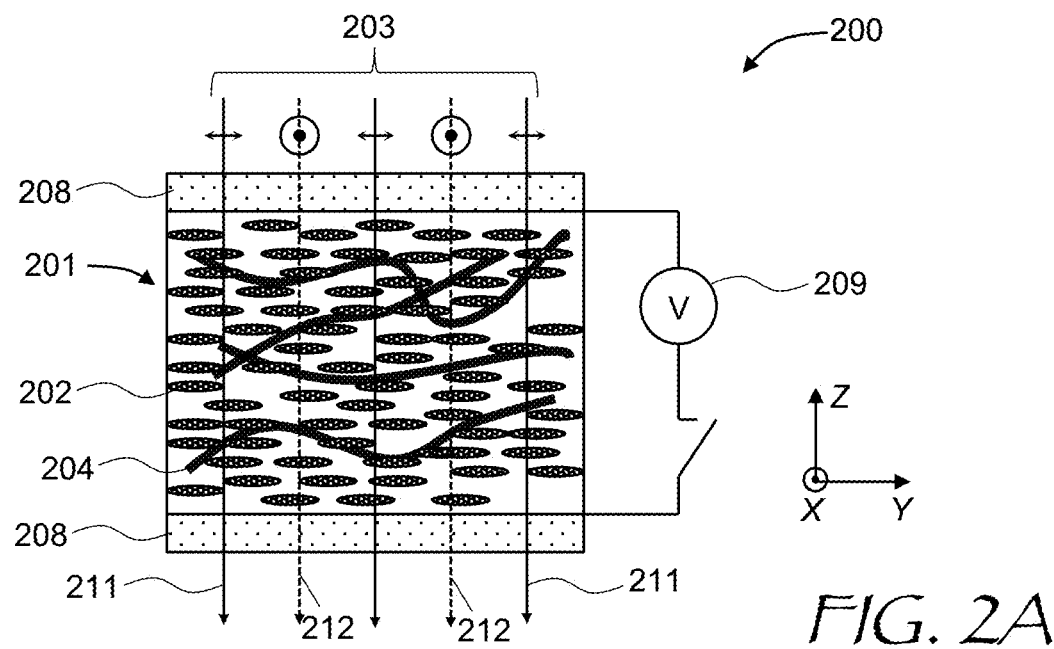
FIG. 2A is a schematic cross-sectional view of a polarization-selective scatterer element based on a polymer-stabilized diffuser (PSD) device in OFF state.
Figure 2B:
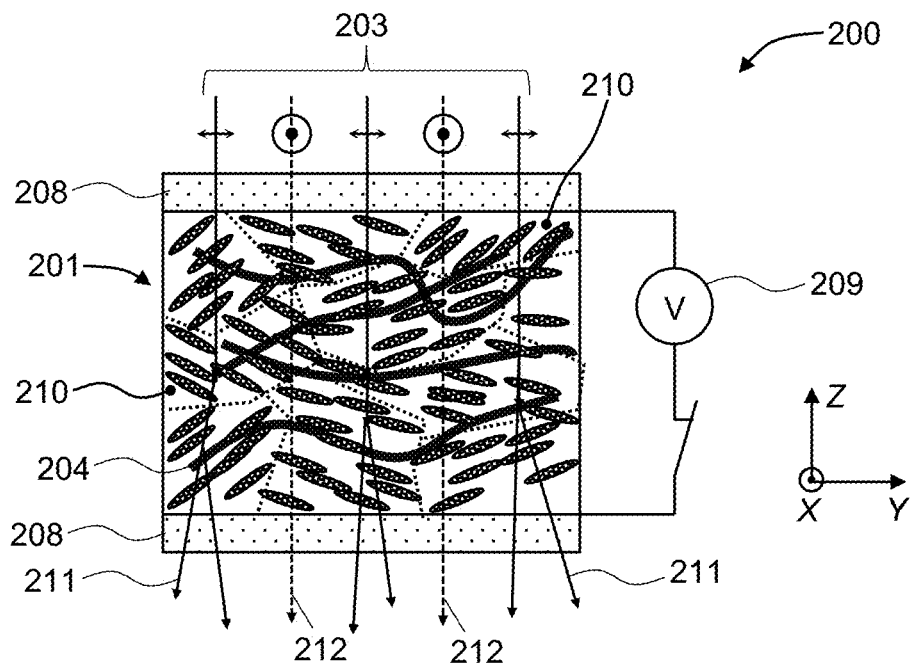
FIG. 2B is a schematic cross-sectional view of the PSD device of FIG. 2A in ON state.

Embodiments of the polarization-selective scatterer 110 will now be considered. Turning to FIGS. 2A and 2B, a polymer-stabilized diffuser (PSD) device 200 includes a cell 201 enclosing a layer 202 of nematic LC molecules dispersed in a polymer network 204, and stabilized by the polymer network 204. The polymer network 204 is shown with thick black lines. The LC molecules may have positive dielectric anisotropy. The cell 201 includes a pair of transparent top and bottom electrodes 208 for applying a voltage across the LC layer 202. The polymer network 204 extends generally in Y-direction, and the LC molecules are homogeneously aligned by the polymer network 204 in the Y-direction when voltage 209 is not applied (FIG. 2A). Thus, the LC layer is stabilized by the polymer network 204. When a X-polarized portion 212 (shown with dashed lines) of a light beam 203 impinges onto the cell 201, no scattering occurs because X-polarized light only encounters constant ordinary refractive index of the LC layer 202. The Y-polarized portion 211 (shown with solid lines) is not scattered either, because the Y-polarized portion encounters a uniform extraordinary refractive index of the LC layer 202.

The application of the voltage 209 (FIG. 2B) creates an electrostatic torque tending to orient the LC molecules vertically, i.e. in Z-direction, while the polymer network 204 provides an elastic force tending to keep the LC in the Y-direction. As a result of competition between the applied electric field and the elastic resistance of the polymer network 204, the LC layer 202 is switched into a multi-domain structure including a plurality of conterminous domains 210. The domains 210 are outlined with dotted-line boundaries. The LC molecules are oriented along the same direction within each domain 210, but the orientations vary from domain 210 to domain 210. The orientations, or directions of the domains 210 are random in YZ plane. Y-polarized portion 211 (solid lines) of the light beam 203 impinging onto the cell 201 encounters different refractive indices in different domains 210 and is therefore scattered. The X-polarized portion 212 of the light beam 203 impinging onto the cell 201 always encounters the ordinary refractive index of the LC molecules, because the LC molecules are oriented in the YZ plane, enabling the X-polarized portion 212 to pass through the cell 201 without scattering. Thus, the electrodes 208 enable electric control of the amount of scattering of the Y-polarized portion 211 of the light beam 203 by the polymer-stabilized LC layer 202.

Many variants of PSD devices are possible. To fabricate an active PSD as depicted in FIGS. 2A and 2B, the LC fluid-monomer mixture is polymerized in presence of a pre-defined voltage Vp, and at a wavelength and dosage of polymerizing light, typically ultraviolet (UV) light, for a pre-defined time. The manufactured configurable occluder will be clear without voltage, and opaque under applied voltage, as shown in FIGS. 2A and 2B.

A passive version of PSD may also be fabricated, as follows. First, the LC fluid and monomer mixture is exposed to polymerizing light at pre-defined wavelength and dosage for a short time. At this step, no voltage is applied to the cell 201. The LC and monomer molecules that are randomly oriented are photo polymerized. Next, a voltage is applied to the cell 201 without any other change, i.e. when cell 201 is still under exposure with same wavelength and dosage as of the first step. After applying voltage, some LC molecules that have lower anchoring will be oriented along the electric field (assuming that the LC material has a positive dielectric anisotropy) and polymerized in that orientation. Therefore the final cell 201 will look opaque. When such cell 201 is used with a polarizer, then for one polarization, the light passes through, while for the orthogonal polarization, the light will be blocked, as shown in FIG. 2B, except no application of voltage to the cell 201 is required to achieve the polarization-selective attenuation/scattering function.

In this and other configurations, the liquid crystal molecules are oriented to have a uniform refractive index for X-polarized portion of the impinging light beam, and a different, spatially varying refractive index for Y-polarized portion of the impinging light beam, for scattering the Y-polarized portion even when the voltage is not applied. It is further noted that the terms "X-polarized portion" and "Y-polarized portion" are relative terms used for convenience, and the performance of a PSD polarization-selective scatterer may be reversed upon rotation of the PSD polarization-selective scatterer by 90 degrees about Z-axis.

In some embodiments, PSD devices are pixelated, i.e. at least one of the transparent electrodes 208 may be pixelated, to provide spatially varying performance of the polarization-selective PSD. For example, referring to FIG. 3, a polarization-selective diffusive combiner 302 is similar to the polarization-selective diffusive combiner 102 of FIGS. 1A and 1B. The polarization-selective diffusive combiner 302 of FIG. 3 includes a pixelated PSD device 310, which is similar to the PSD device 200 of FIGS. 2A and 2B, but has at least one of the transparent electrodes 208 pixelated. In other words, the polarization-selective diffusive combiner 302 includes an array of electrically insulated, individually addressable segments or pixels 331, 332 for applying the voltage to the LC layer 202 in a spatially-selective manner.

Figure 3:
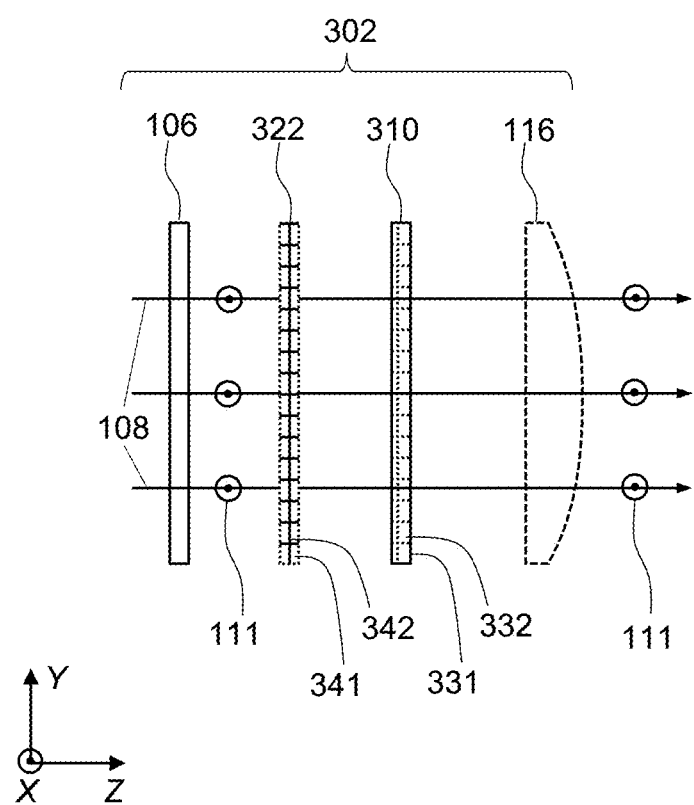
FIG. 3 is a schematic cross-sectional view of a variant of a polarization-selective diffusive combiner including a pixelated PSD device coupled to an array of polarization rotators.

As shown in FIG. 3, the pixels 331, 332 of the PSD device 310 may be spatially registered with polarization rotators 341, 342 of the array 322 of polarization rotators, such that same portions of the ambient light 108 propagated through the polarization rotators 341, 342 subsequently propagate through the corresponding pixels 331, 332 of the PSD device 310. The pixelated PSD device 310 may enable a spatially-selective control of scattering of the second light beam 105, thus facilitating a better control of scattering properties of the pixelated PSD device 310. Any of or both of the pixelated PSD devices 310 and the array of polarization rotators 322 may be operated in a binary mode, i.e. with two driving voltages providing two states with distinct polarization properties, and/or in a smoothly varying/grayscale mode providing states with smoothly varying polarization properties. In other words, any one or both of the PSD device 200 of FIG. 2, the pixelated PSD device 310 of FIG. 3, and the LC array (TN, STN, FSTN, FFS, IPS, etc.) used as the configurable polarization rotator 122 and/or the array of polarization rotators 322, may be operated in a binary or a grayscale mode.

Figure 4A:
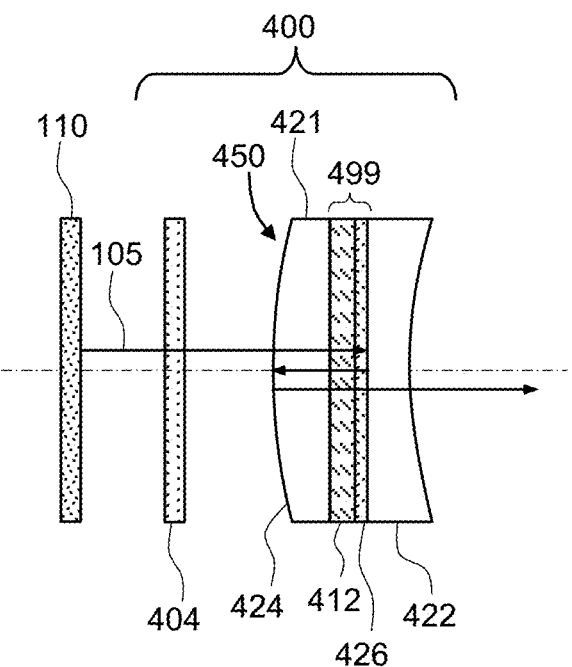
FIG. 4A is a side cross-sectional view of a pancake lens having focusing power dependent on a polarization state of incoming light.

Embodiments of the polarization-selective focusing element 116 will now be considered. Referring to FIG. 4A, a pancake lens 400 includes a first quarter-wave waveplate 404 with optic axis at 45 degrees w.r.t. the transmission axis of the polarizer 110, and a lens subassembly 450 disposed downstream of the first quarter-wave waveplate 404. The lens subassembly 450 includes a plano-convex lens 421 having a partial (typically 50%, e.g. 50%+−10%) reflector 424 coated on its convex side facing the polarization-selective scatterer 110 (or the pixelated polarization-selective scatterer 310, as the case may be). About 50% of light is transmitted through the partial reflector 424. A second quarter-wave waveplate 412 is in contact with a flat side of the plano-convex lens 421. A reflective polarizer 426 is in contact with the second quarter-wave waveplate 412. The reflective polarizer 426 has a transmission axis at 45 degrees relative to an optic axis of the second quarter-wave waveplate 412. Together, the second quarter-wave waveplate 412 and the reflective polarizer 426 form a polarization-selective reflector 499. A plano-concave lens 422 has a flat side in contact with the reflective polarizer 426. Thus, the lens subassembly 450 includes a plano-convex lens 421, a plano-concave lens 422, and a stack of the second quarter-wave waveplate 412 and the reflective polarizer 426 sandwiched between flat sides of the lenses 421, 422. The plano-convex 421 and plano-concave 422 lenses can be bonded together by the stack of the second quarter-wave waveplate 412 and the reflective polarizer 426, or they may be fixed separately from one another for alignment purposes.

In operation, the display light 105 propagates through the first quarter-wave waveplate 404 and becomes circularly polarized. The display light 105 gets focused by refraction at the convex surface of the plano-convex lens 421, then reflects back towards the partial reflector 424, as shown with solid arrows. The partial reflector 424 acts as a concave mirror, further focusing the reflected display light 105 and directing the reflected display light 105 towards the plano-concave lens 422. The concave side of the plano-concave lens 422 defocuses the display light 110 by refraction, undoing the refractive focusing portion by the convex surface of the plano-convex lens 421.

Figure 4B:
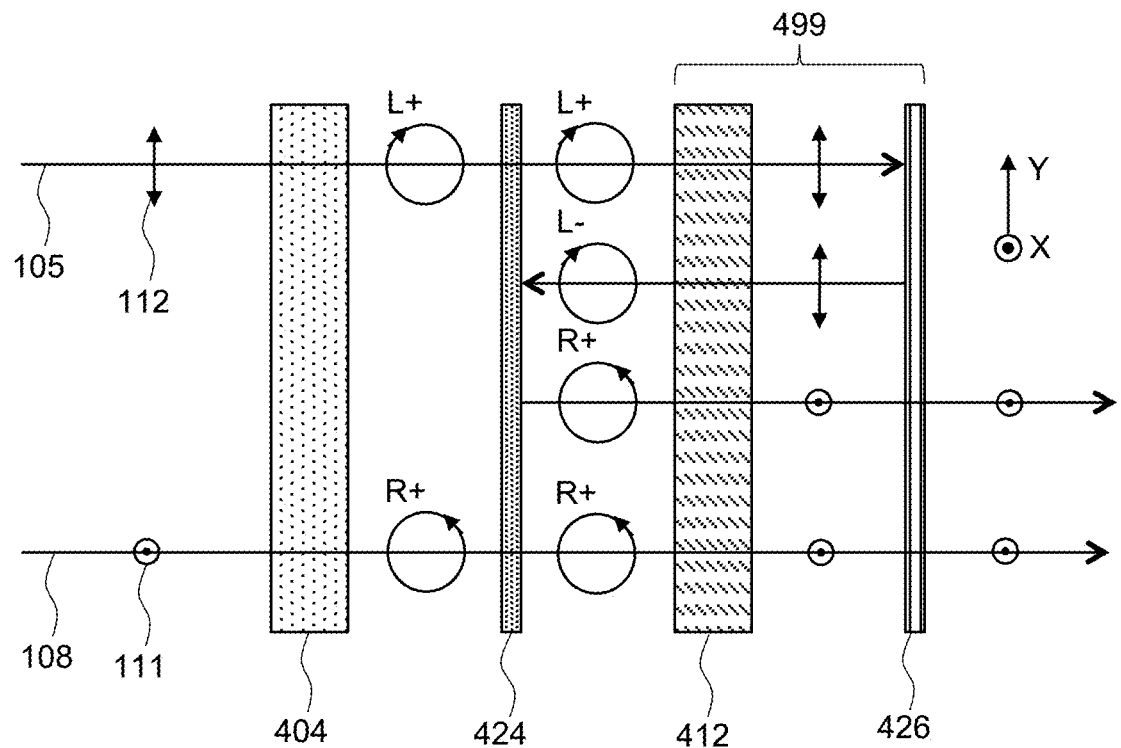
FIG. 4B is a polarization diagram for light propagating through the pancake lens of FIG. 4A.

The folded optical path of the display light 105 is achieved by manipulating polarization of the display light 105 as the display light 105 propagates from the polarization-selective scatterer 110 to the user's eye. Referring to FIG. 4B, the display light 105 propagates through the first quarter-wave waveplate 404 and becomes left-circularly polarized, as indicated by "L+". Herein, the sign "+" relates to the direction of propagation, which is assumed to be positive in going from left to right, and negative ("−") in going from right to left in FIGS. 4A and 4B. The display light 105 then impinges on the partial reflector 424 (FIG. 4B), and a portion of that light, 50% in this case, propagates through the plano-convex lens 421, impinging on the second quarter-wave waveplate 412. This brings the polarization back to linear Y-polarized. Then, the display light 105 impinges onto the reflective polarizer 426 having a transmission axis oriented along X-axis and a reflection axis oriented along Y-axis. The display light 105, being polarized along Y-axis, is reflected by the reflective polarizer 426 to propagate in "−" direction, i.e. right to left. A small portion of that light, typically less than 1%, is transmitted due to misalignment and finite extinction ratio of the reflective polarizer 426, however it is strongly out of focus and as such is usually not of a significant concern. The polarization of the reflected display light 105 is linear and is oriented along Y-axis. The reflected display light 105 propagates back (i.e. right to left in FIG. 4B) through the second quarter-wave waveplate 412, after which its polarization becomes L− circular polarization. Then, the reflected light propagates through the plano-convex lens 421 (FIG. 4A). The partial reflector 424 reflects a portion of the display light 105 to propagate towards the user's eye, not shown. That portion is right circular polarized (R+; FIG. 4B), since handedness of a circular polarization changes upon reflection from a mirror. Upon propagating through the second quarter-wave waveplate 412, the display light 105 acquires a linear polarization oriented along X-axis, which is then passed through by the reflective polarizer 426.

The optical path of the ambient light 108 will now be considered. Initially, the ambient light 108 is X-polarized, i.e. is in the first polarization state 111 (FIGS. 1A, 1B, and FIG. 4B). That polarization state is preserved upon propagation through the polarization-selective scatterer 110, which is omitted in FIG. 4B for brevity. Upon propagation through the first quarter-wave waveplate 404, the ambient light 108 becomes right-circular polarized. The right circular-polarized light 108 gets focused by the convex refractive surface of the plano-convex lens 421. The right circular polarization is retained up to the second quarter-wave waveplate 412, which then transforms it back into the linear X-polarization, causing it to propagate through the reflective polarizer 426. The X-linear polarized ambient light 108 is un-focused by the concave refractive surface of the plano-concave lens 422, negating the previous focusing by the convex refractive surface of the plano-convex lens 421. Thus, the ambient light 108 propagates through the pancake lens 400 substantially without focusing or defocusing.

Other orientation of the polarization components depicted in FIGS. 4A and 4B are possible. For example, all polarization components may be rotated together about an optical axis by a same amount. Other refractive/reflective surface configurations are possible, as well. For example, in some embodiments, a polarization-selective lens may have different optical powers for two orthogonal polarizations, both optical powers being non-zero optical powers. In such a case, a conventional compensation lens may be provided to effectively null out one of these optical powers.

To better highlight the added virtual content, an NED of this disclosure may have a capability to selectively dim the outside environment at an area where a virtual object is to be displayed, making the virtual object appear to occlude a portion of outside world environment, thereby causing the virtual object to appear opaque to the NED user. As noted above with reference to FIG. 1A, the polarization-selective scatterer 110, when used in combination with the array of polarization rotator 322, may be used to achieve the occluding function. The polarization-selective scatterer 110 also operates in conjunction with the image projector 104 and the focusing lens 116 to form the added (virtual) image in angular domain. The two images may then be viewed together.

Figure 5:
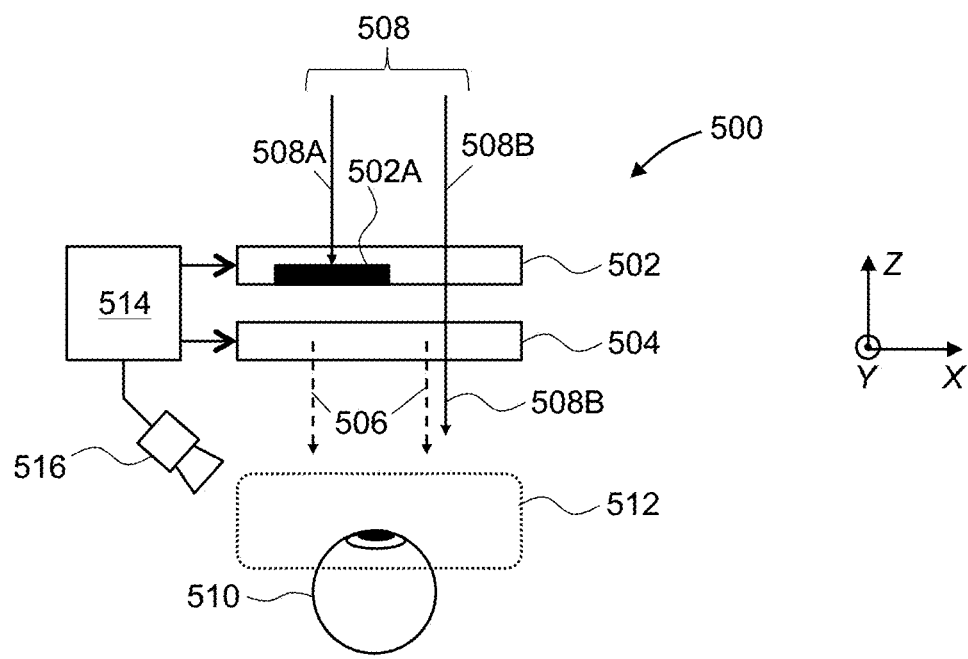
FIG. 5 is a schematic cross-sectional view of a near-eye display including a configurable occluder.

Referring to FIG. 5, an NED 500 includes a configurable occluder 502, which may include the polarization-selective scatterer 110 in combination with the array of polarization rotators 322, and a display module 504 downstream of the configurable occluder 502. The display module 504 may include the polarization-selective scatterer 110 in combination with the image projector 104 and the focusing lens 116. The configurable occluder 502 and the display module 504 are shown separately in FIG. 5 for purposes of illustration and explanation even though, as noted above, they may share the common polarization-selective scatterer 110.

An eye 510 of the user disposed in an eyebox 512 can observe the outside environment through the NED 500 by receiving the propagated ambient light portion(s) 508B, and also observe the display-generated image carried by display light 506, simultaneously or in a time-sequential manner. Herein, the term "eyebox" refers to a geometrical area where the display-generated image of acceptable image quality may be observed.

To improve the see-through function, the ambient light 508 and the display light 506 may be orthogonally polarized. For example, the display module 504 may be made transparent for the X-polarized ambient light 508, while providing the display light 506 linearly polarized along Y-axis.

The NED 500 may further include a controller 514 operably coupled to the display module 504 and the configurable occluder 502, e.g. to an array of polarization rotators upstream of a polarization-selective scatterer. The controller 514 may be configured to obtain an image to be displayed to the user. The image may include a virtual object to occlude a corresponding portion of ambient environment observed by the user, for added perception of reality of the virtual imagery, and/or for a better visual contrast of the virtual objects being displayed. More generally, the image to be displayed may include a region intended to dim or occlude the corresponding portion of outside environment. To achieve the occlusion effect, the controller 514 may operate the configurable occluder 502 to dim the corresponding portion of the outside environment by reducing the transparency of the configurable occluder 502 in an occlusion area 502A of the configurable occluder 502. The controller 514 may operate the display module 504 to provide the display light 506 carrying the image to be displayed, simultaneously or in a time-sequential manner.

In some embodiments, the NED 500 further includes an eye tracker 516 for determining, in real time, at least one of position or orientation of the user's eye 510 in the eyebox 512. The controller 514 may be configured to use the eye tracker 516 to determine the at least one of the eye position or orientation of each eye 510 of the user in the eyebox 512 with the purpose of determining parallax of the occluding region in accordance with the determined eye position and/or orientation, and to adjust size and/or position of the occluding region, to account for the parallax of the occluding region. The dependence of the size and position of the occluding region on the eye position and orientation will be considered further below.

Figure 6:
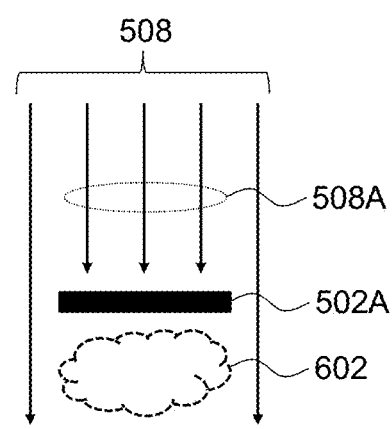
FIG. 6 is a schematic diagram illustrating a principle of occlusion of a portion of a real-world environment to make a virtual object more noticeable.

Occlusion of a portion of a real-world environment is illustrated in FIG. 6. A virtual object 602 is displayed by the NED 500 to a user. An area of the virtual object 602, i.e. a projection of the virtual object 602 on the outside world as seen by the user, is to occlude the portion 508A of the ambient light 508. To that end, the transparency, i.e. the optical throughput of the occlusion area 502A of the configurable occluder 502 is reduced, making the virtual object 602 appear to block a portion of the outside environment represented by the portion 508A of the ambient light 508. This improves the fidelity of the virtual object 602, making it appear immersed into the outside world environment.

Figures 7A, 7B:
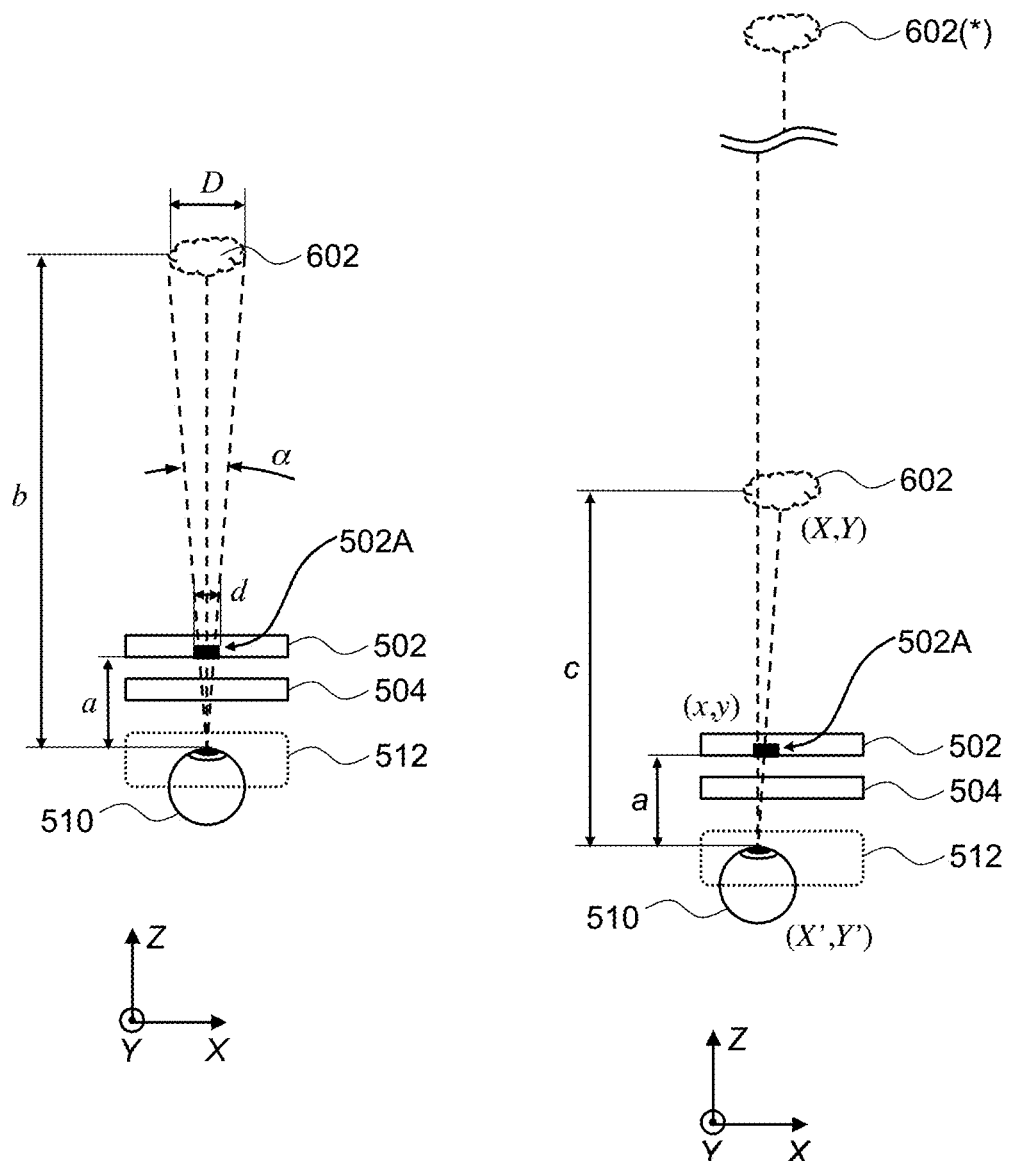
FIG. 7A is a schematic cross-sectional view of a near-eye display illustrating the principle of selecting a size of an occluding area of the configurable occluder based on angular size of an occluding region of the image.
FIG. 7B is a schematic cross-sectional view of a near-eye display illustrating the principle of selecting a position of an occluding area of the configurable occluder based on parallax of the occluding region of the image.

The principles of configuring the occlusion area 502A of the configurable occluder 502 depending on the size and shape of the occluding area (e.g. occluding virtual object) and the viewer's eye pupil position will now be explained using several illustrative examples. Referring first to FIG. 7A, the display module 504 provides an image of the virtual object 602 of a linear size D at a distance b from the pupil of the user's eye 510. Accordingly, the angular size a of the virtual object 602 may be determined from the equation $$\tan(\alpha/2)=D/2b \qquad (1)$$

The occluder 502 is disposed at a distance a from the pupil of the user's eye 510. Note that the distance a may be determined by an eye tracker in real time. The linear size d of the occlusion area 502A of the configurable occluder 502 may be found as $$d=(a/b)D \qquad (2a)$$

or, for on-axis objects, $$d=2a\tan(\alpha/2) \qquad (2b)$$

The shape of the occlusion area 502A may repeat the shape of the virtual object 602. Smoothing or feathering of the boundary of the occlusion area 502A may be provided for the occluding virtual object 602 to look naturally immersed into the real-world environment as viewed by the user.

The lateral location of the occluding area 502A in the configurable occluder 502 may be determined as illustrated in FIG. 7B. For simplicity, the virtual object 602 is located at a straight angle to the see-through display module 504, that is, in a direction straight ahead in front of the viewer. First, a case is considered where the virtual object 602 displayed by the display module 504 is located at infinity, as indicated with an asterisk (*). In this configuration, the coordinates (x,y) of the occluding area 502A are equal to the coordinates (X',Y') of the user's eye 510, which may be obtained by using an eye tracker.

In a case where the virtual object 602 is located at a finite distance c from the user's eye 510 at a straight angle to the display module 504, the coordinates (x,y) of the occluding area 502A may be adjusted for parallax in the following manner:

$$(x,y)=(X',Y')-(a/c)(X'-X,Y'-Y) \qquad (3)$$

Figure 7C:
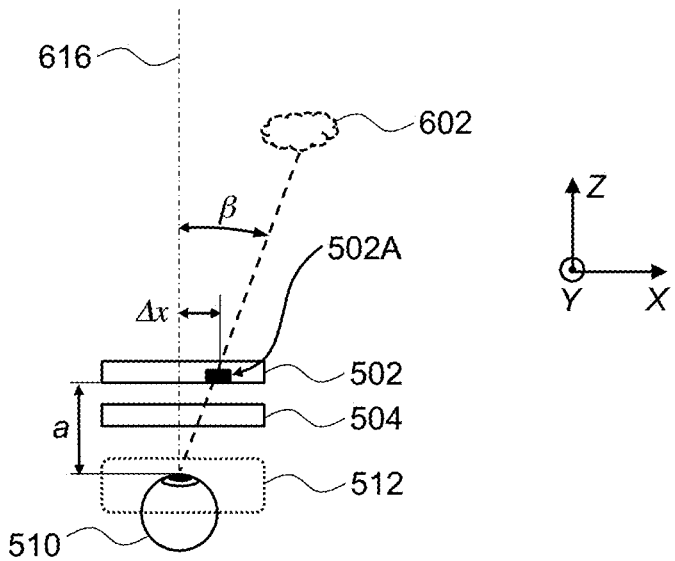
FIG. 7C is a schematic cross-sectional view of a near-eye display illustrating the principle of selecting a position of an occluding area of the configurable occluder based on angular position of the occluding region in the image.

Virtual objects offset from a center of the field of view of the display module 504 will also experience parallax due to the configurable occluder 502 being disposed at a finite distance from the user's eye 510. Referring to FIG. 7C for example, the virtual object 602 representing the occluding region of the virtual image being displayed is disposed at an angle β in XZ plane with respect to a viewing normal 616. From the geometry of the display configuration, one obtains a shift Δx of the x-coordinate of the occluding area 502A as follows:

$$\Delta x = \alpha \tan \beta \qquad (4)$$

The y-coordinate of the occluding area 502A is determined similarly, by considering a corresponding viewing angle in YZ plane. Together, Eqs. (1) through (4) enable one to determine size and position of the occluding area 502A in the configurable occluder 502 while accounting for parallax effects. The controller 514 of the NED 500 (FIG. 5) may be suitably configured to adjust the size and position of the occluding area 502A in accordance with Eqs. (1) to (4). The required eye pupil position in (X', Y', Z') may be determined using the eye tracker 516 operably coupled to the controller 514.

Figure 8:
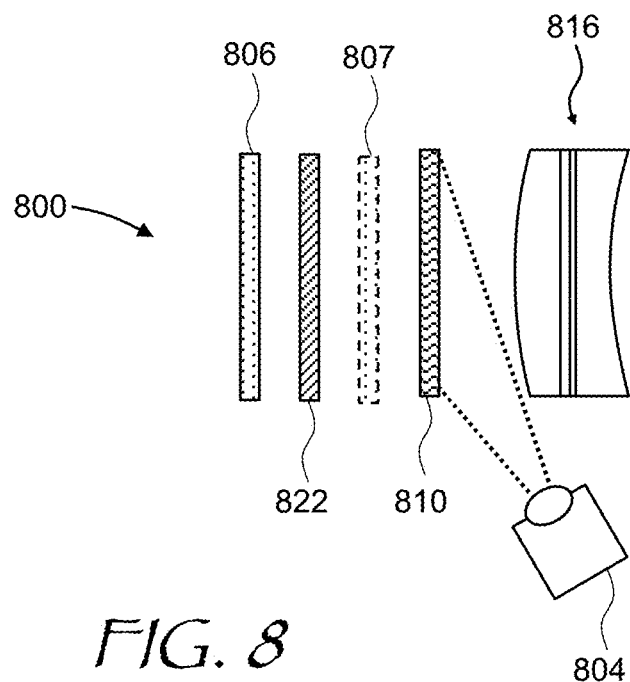
FIG. 8 is a schematic cross-sectional view of a near-eye display including a configurable polarization rotator, a polarization-selective scatterer, and a polarization-selective focusing element.

Referring to FIG. 8, an NED 800 is an embodiment of the NED 100A of FIG. 1A, the NED 100B of FIG. 1B, and the NED 500 of FIG. 5. The NED 800 of FIG. 8 includes a polarizer 806, e.g. a linear transmission polarizer, for polarizing impinging ambient light to have a first polarization state. A configurable polarization rotator 822 is disposed downstream of the polarizer 806 for changing a polarization state of at least a portion of the impinging ambient light from the first polarization state, e.g. a first linear polarization to a second polarization state orthogonal to the first polarization state, e.g. a second linear polarization orthogonal to the first linear polarization.

A polarization-selective scatterer 810 is disposed downstream of the configurable polarization rotator 822. In operation, the configurable polarization-selective scatterer 810 transmits through a portion of the ambient light having the first polarization state substantially without scattering, while scattering a portion of the ambient light having the second polarization state back towards the polarizer. The polarization-selective scatterer 810 may be based on the PSD of FIGS. 2A and 2B, or some other type of a polarization-selective scatterer, such as a Pancharatnam-Berry Polymer-Stabilized Diffuser (PB-PSD). A PB-PSD receives input light, and a right-handed (RH) circularly polarized portion of the light is scattered while changing its polarization to left-handed (LH) circular polarization. The LH polarized portion of the light propagates without scattering, but changes its polarization from LH to RH. A PB-PSD may be implemented in a polymer-dispersed LC layer. Quarter-wave waveplates may be required to convert between linear and LH/RH polarization. PB-PSD may also be used as the polarization-selective scatterer 110 in the NED 100A of FIG. 1A and NED 100B of FIG. 1B, together with waveplates for converting between linear and circular polarization(s), as required.

A projector 804 is disposed downstream of the polarization-selective scatterer 810. The projector 804 may also be disposed upstream of the polarization-selective scatterer 810. The projector 804 provides display light having the second polarization state. The projector 804 is configured to form an image in linear domain on the polarization-selective scatterer 810. By way of non-limiting examples, the projector 804 may include a scanning projector or be based on a microdisplay coupled to a collimator.

A focusing element 816 is disposed downstream of the polarization-selective scatterer 810. The focusing element 816 forms an image in angular domain from the display light having the second polarization state scattered by the polarization-selective scatterer 810 towards the focusing element 816, while transmitting the portion of the ambient light having the first polarization state substantially without focusing or defocusing. The focusing element may include, for example, the polarization-selective pancake lens 400 of FIGS. 4A and 4B.

In some embodiments, the NED 800 further includes a second polarizer 807 disposed downstream of the configurable polarization rotator 822 and upstream of the polarization-selective scatterer 810. The second polarizer 807 transmits through a portion of the ambient light having the first polarization state, while attenuating (absorbing, reflecting, or both) the portion of the ambient light having the second polarization state.

Figure 9A:
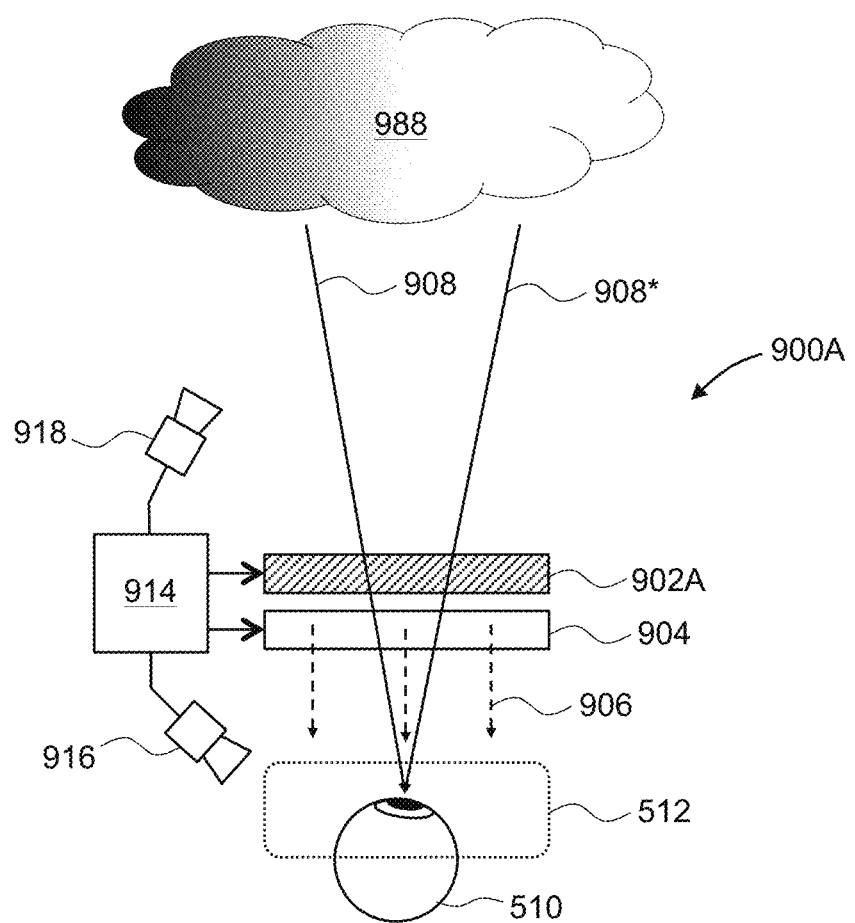
FIG. 9A is a schematic cross-sectional view of a near-eye display including a tunable dimmer based on a polarization-selective scatterer element.

Referring to FIG. 9A, an NED 900A is an embodiment of the NED 100A of FIG. 1A, the NED 100B of FIG. 1B, the NED 500 of FIG. 5, and the NED 800 of FIG. 8. The NED 900A of FIG. 9A includes a tunable dimmer 902A and a display module 904 disposed downstream of the tunable dimmer 902A. The tunable dimmer 902A may include the polarization-selective scatterer 110 in combination with the configurable polarization rotator 122 (FIGS. 1A, 1B). The display module 904 may include the polarization-selective scatterer 110 in combination with the image projector 104 and the focusing lens 116. The tunable dimmer 902A and the display module 904 are shown separately in FIG. 9A for purposes of illustration and explanation even though, as noted above, they may (but do not have to) share the common polarization-selective scatterer 110. A separate polarizer may be provided for dimming external light, similarly to the NED 800 having the second polarizer 807 (FIG. 8). In operation, the display module 904 (FIG. 9A) provides display light 906 conveying an image in angular domain to the eyebox 512, while transmitting outside light 908, 908* from outside environment 988, propagated through the tunable dimmer 902A.

The NED 900A may further include an eye tracker 916 for determining at least one of position or orientation of the user's eye 510 in the eyebox 512. An outward-facing camera 918 may be provided for determining brightness of the ambient environment 988 in an angular-selective manner, i.e. the angular brightness distribution of ambient light. By way of an illustrative example, the outward-facing camera 918 may determine that a left portion of the ambient environment 988 is comparatively dim, providing a low-intensity left light beam 908, while a right portion of the ambient environment 988 is comparatively bright, providing a high-intensity left light beam 908*.

The NED 900A may further include a controller 914 operably coupled to the display module 904, the configurable polarization rotator 122 of the tunable dimmer 902A, the outward-facing camera 918, and the eye tracker 916. The controller 914 may be configured to use the eye tracker 916 to determine the current gaze direction of the user's eye 510, use the outward-facing camera 918 to determine the current brightness level of the outside environment in the gaze direction as determined by the eye tracker 916, and operate the tunable polarization rotator of the tunable dimmer 902A to dim the outside environment 988 in accordance with the ambient light brightness in the determined gaze direction of the user's eye 510.

For example, if the user's eye 510 gazes in the direction of the low-intensity left light beam 908, the amount of applied dimming may be comparatively small, or no dimming may be applied at all. If, however, the user's eye 510 gazes in the direction of the high-intensity right light beam 908*, the amount of applied dimming may be increased. This may be useful in reducing or preventing the contrast loss of the image being displayed to the user by the display module 904. If the dimming of the outside environment 988 is not applied, the high-intensity right light beam 908* from the bright portion of the outside environment 988 may overwhelm the corresponding portion of the image displayed to the user by the display module 904.

Figure 9B:
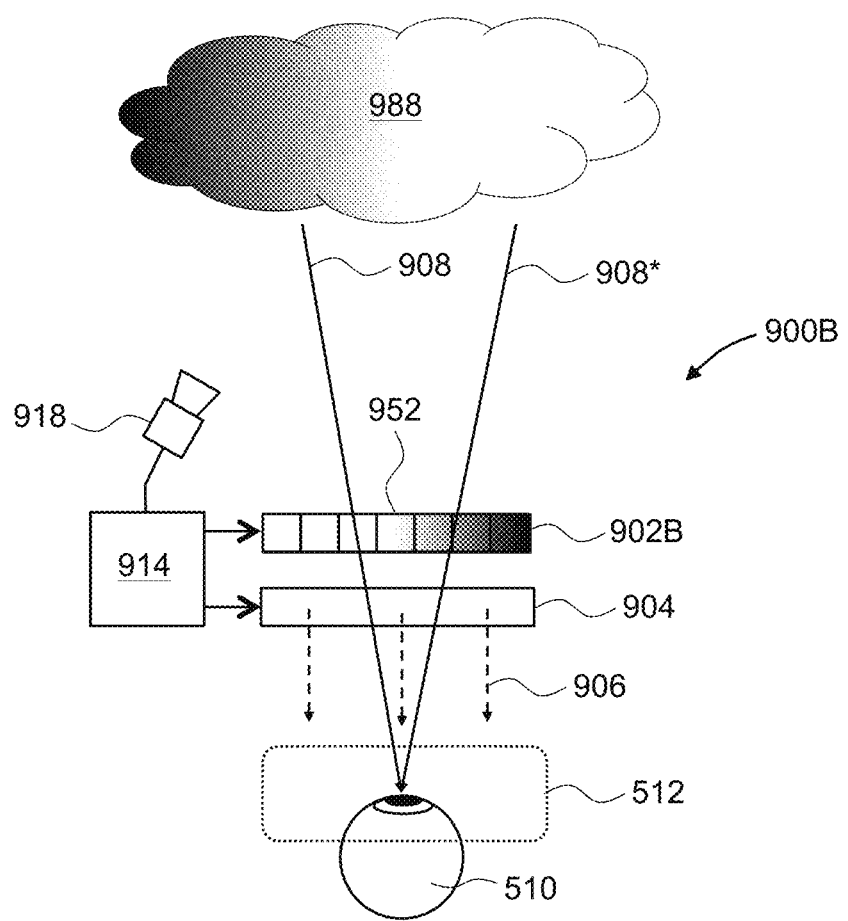
FIG. 9B is a schematic cross-sectional view of a near-eye display including a configurable pixelated dimmer/occluder based on a polarization-selective scatterer element.

Referring to FIG. 9B, an NED 900B is similar to the NED 900A of FIG. 9A, with a difference being that the configurable polarization rotator 122 of a dimmer 902B is pixelated, i.e. includes an array of individually controllable polarization rotator elements, for spatially varying a polarization state of the ambient light. This enables the dimmer 902B to dim the ambient light beams 908, 908* in a spatially-selective, or spatially-variant, manner.

The NED 900B includes the outward-facing camera 918 for determining brightness of the ambient environment 988 as a function of a viewing angle. For example, the outward-facing camera 918 may determine that the left portion of the ambient environment 988 is comparatively dim, providing the low-intensity left light beam 908, while the right portion of the ambient environment 988 is comparatively bright, providing the high-intensity right light beam 908*. The NED 900B further includes the controller 914 operably coupled to the display module 904, the array of individually controllable polarization rotator elements of the pixelated dimmer 902B, and the outward-facing camera 918. An eye tracker (not shown) may also be provided. The controller 914 may be configured to use the outward-facing camera 918 to determine the angular distribution of brightness of the outside environment 988.

The controller 914 may then operate the individual polarization rotators of the tunable dimmer 902B to dim the outside environment in a spatially-variant manner in accordance with the angular distribution of brightness of the ambient environment, i.e. the outside environment. For example, the amount of applied dimming may be comparatively small in the direction of the low-intensity left light beam 908, or no dimming may be applied at all. The amount of applied dimming in the direction of the high-intensity right light beam 908* may be high, as shown schematically with different grades of shading of individual dimmer elements 952 of the pixelated dimmer 902B. This may be useful in reducing or preventing the contrast loss of the image being displayed to the user by the display module 904.

If the spatially-selective dimming of the outside environment 988 were not applied, the high-intensity right light beam 908* from a bright portion of the ambient environment 988 would overwhelm the corresponding portion of the image displayed to the user. This enables the perceived contrast of the displayed image to be preserved across the entire image, regardless of the angular distribution of outside environment illumination levels.

Figure 10:
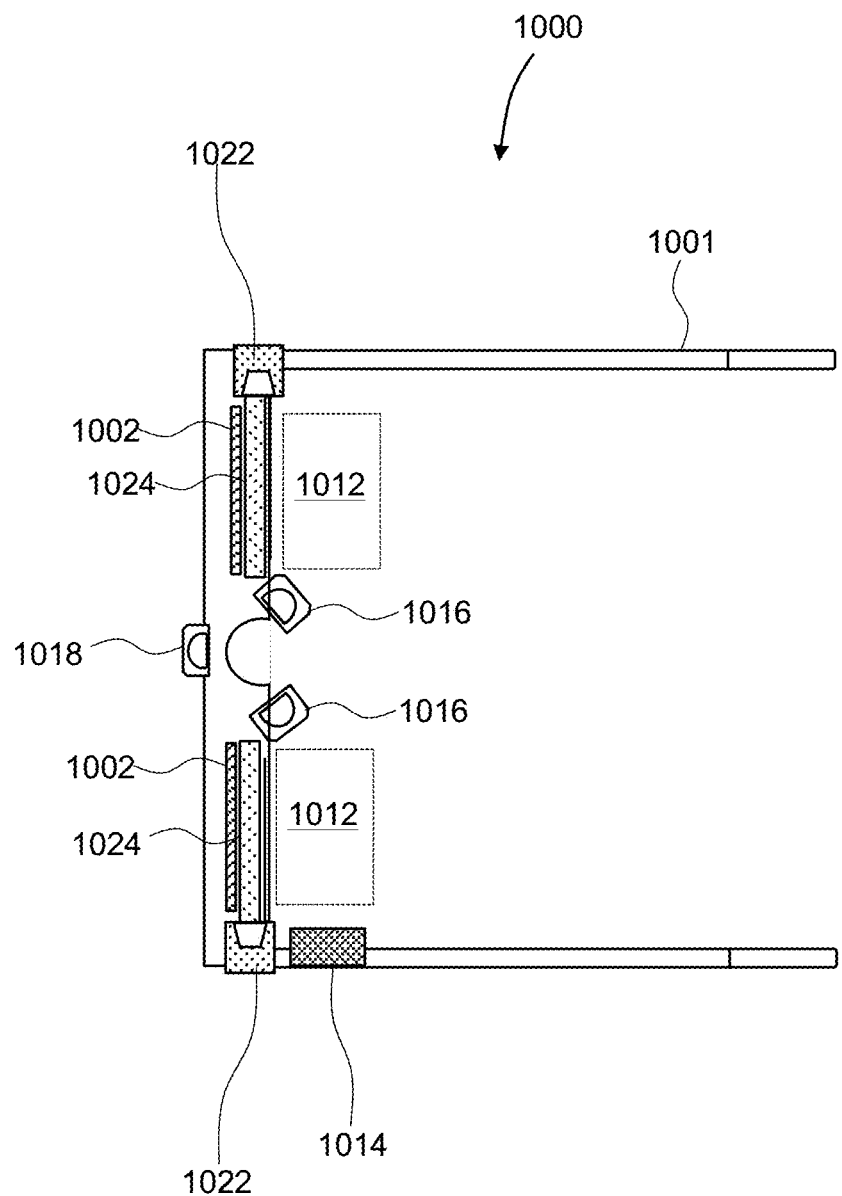
FIG. 10 is a top cross-sectional view of a near-eye display of this disclosure having a form factor of eyeglasses.

Turning to FIG. 10, an NED 1000 is an embodiment of the NED 100A of FIG. 1A, the NED 100B of FIG. 1B, the NED 500 of FIG. 5, the NED 800 of FIG. 8, the NED 900A of FIG. 9A, and the NED 900B of FIG. 9B. The NED 1000 of FIG. 10 includes a frame 1001 having a form factor of a pair of eyeglasses. The frame 1001 supports, for each eye: a projector 1022, a polarization-selective scatterer 1024, an array of configurable polarization rotators 1002, and an eye-tracking camera 1016. An outward-facing camera 1018 may be provided to determine angular brightness distribution of the outside world (ambient) environment. A controller 1014 may be provided to operate the image projectors 1022 and the array of configurable polarization rotators 1002 based on the input from the eye trackers 1016 and/or the outward-facing camera 1018, as described above. The image projector 1022 may be based on a micro-display or a light engine coupled to a scanner. The light engine may include a substrate supporting an array of single-mode or multimode semiconductor light sources, e.g. side-emitting laser diodes, vertical-cavity surface-emitting laser diodes, SLEDs, or light-emitting diodes, for providing a plurality of light beams. The scanner may include a 2D microelectromechanical system (MEMS) scanner, for example.

The polarization-selective scatterer 1024 operates as a screen for the display light emitted by the projector 1022 while transmitting an orthogonally polarized ambient light. The eyeboxes 1012 denote geometrical areas for placing the user's eyes when a user wears the NED 1000. When the user's eyes are located in the areas outlined by the eyeboxes 1012, an image of acceptable quality may be displayed to the user.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
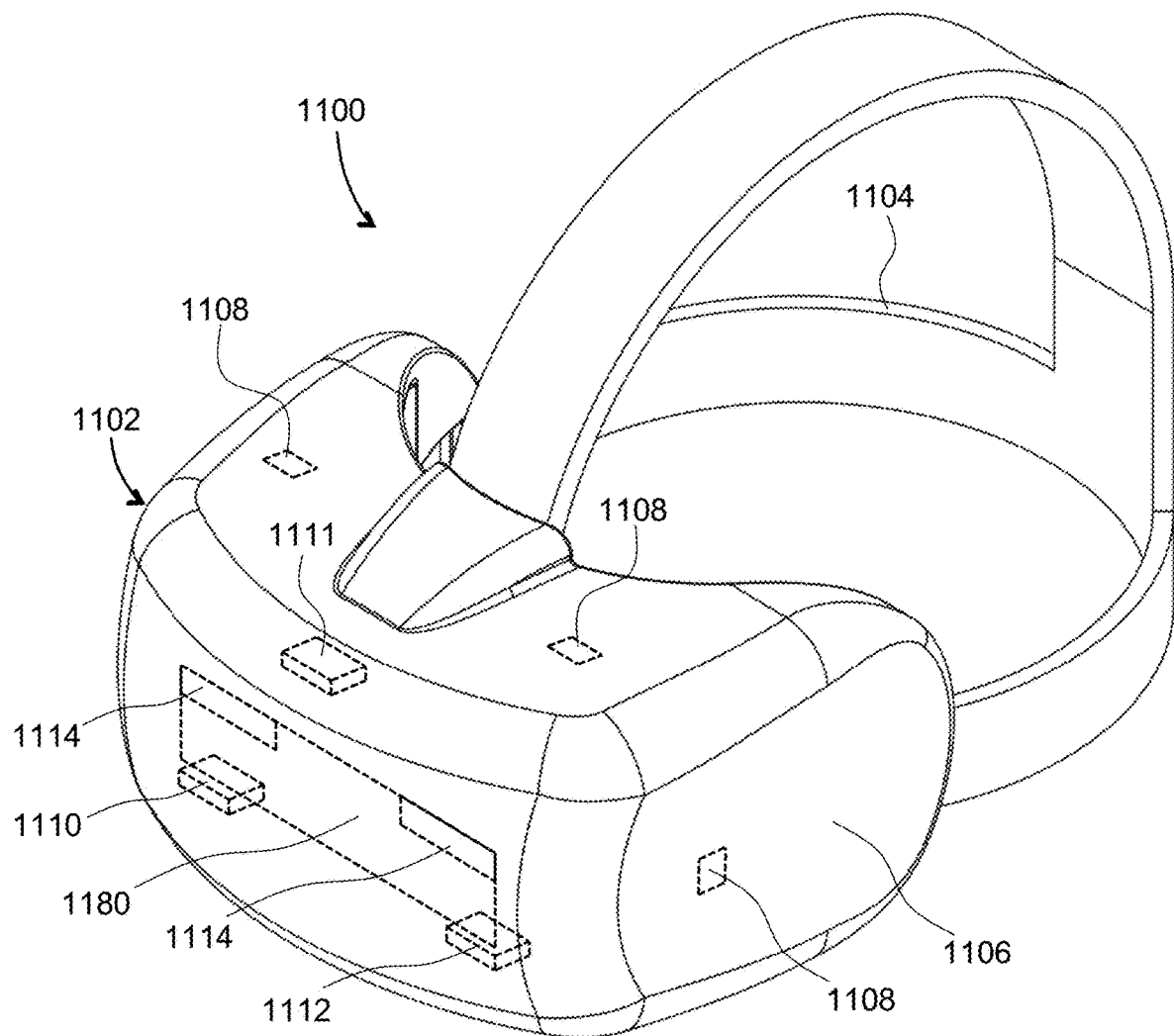
FIG. 11A is an isometric view of a head-mounted display headset of this disclosure.

Referring to FIG. 11A, an HMD 1100 is an example of an AR/VR wearable display system which encloses the user's face, for a greater degree of immersion into the AR/VR environment. The HMD 1100 is an embodiment of the NED 100A of FIG. 1A, the NED 100B of FIG. 1B, the NED 500 of FIG. 5, the NED 800 of FIG. 8, the NED 900A of FIG. 9A, the NED 900B of FIG. 9B, and the NED 1000 of FIG. 10. The function of the HMD 1100 is to augment views of a physical, real-world environment with computer-generated imagery, and/or to generate entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
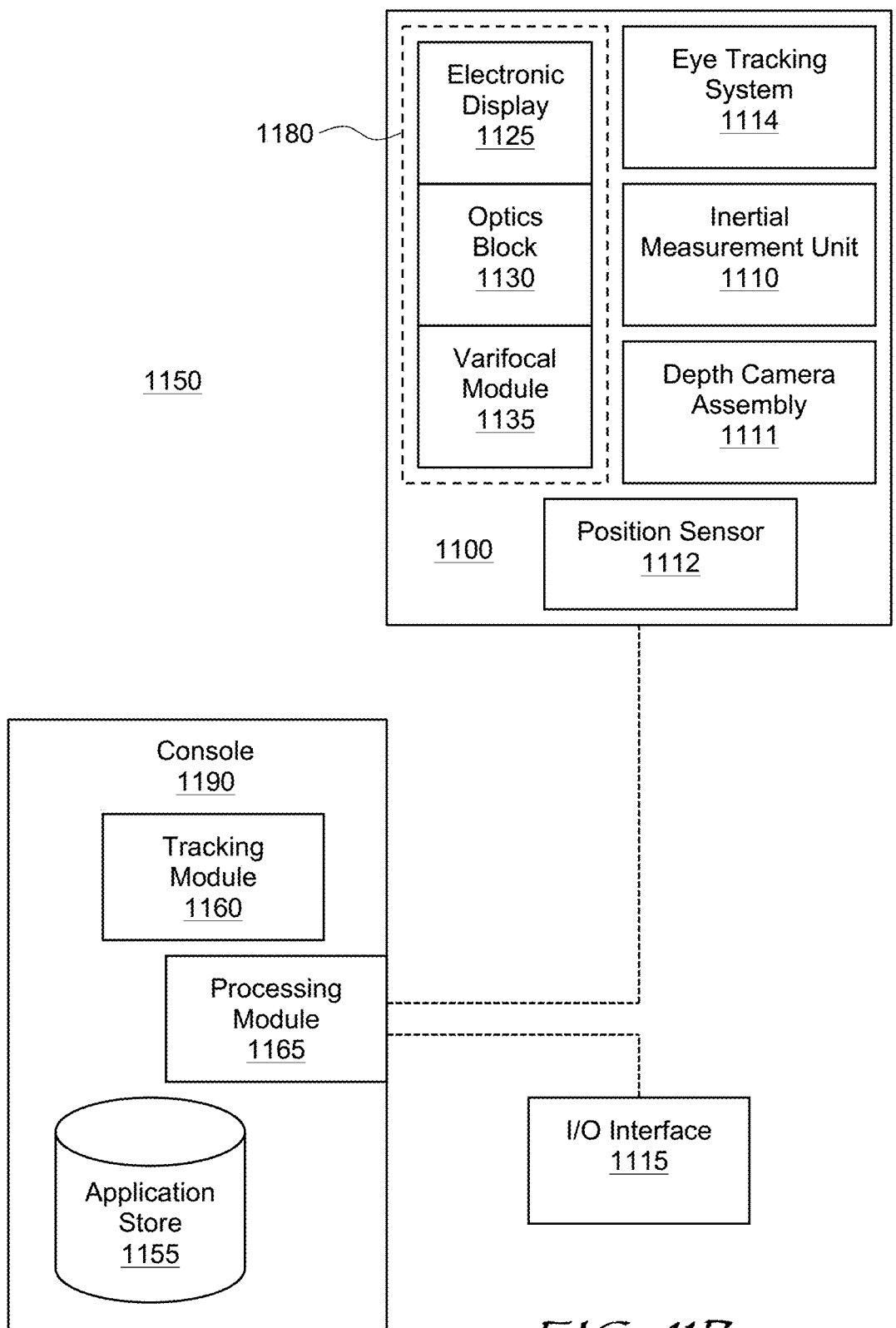
FIG. 11B is a block diagram of a virtual reality system including the headset of FIG. 11A.

Referring to FIG. 11B, an AR/VR system 1150 may be used in conjunction with any NED disclosed herein, including the NED 100A of FIG. 1A, the NED 100B of FIG. 1B, the NED 500 of FIG. 5, the NED 800 of FIG. 8, the NED 900A of FIG. 9A, the NED 900B of FIG. 9B, and the NED 1000 of FIG. 10. In the embodiment shown, the AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1115 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A polarization-selective diffusive combiner comprising:
   a polarizer for polarizing impinging ambient light to have a first polarization state; and
   a polarization-selective scatterer downstream of the polarizer, for receiving and propagating therethrough the ambient light having the first polarization state substantially without scattering, while scattering impinging display light having a second polarization state orthogonal to the first polarization state.

2. The polarization-selective diffusive combiner of claim 1, wherein the first and second polarization states are orthogonal linear polarization states, wherein the polarization-selective scatterer comprises a polymer-stabilized liquid crystal layer comprising liquid crystal molecules dispersed in and aligned by a polymer network extending in a direction perpendicular to a plane of polarization of the first polarization state, whereby the liquid crystal molecules are oriented to have a uniform refractive index for the ambient light having the first polarization state, and a different, spatially varying refractive index for the display light having the second polarization state, for scattering the display light having the second polarization state.

3. The polarization-selective diffusive combiner of claim 2, wherein the polarization-selective scatterer further comprises first and second transparent electrodes, wherein the polymer-stabilized liquid crystal layer is disposed between the first and second transparent electrodes for electric control of amount of scattering of the display light by the polymer-stabilized liquid crystal layer.

4. The polarization-selective diffusive combiner of claim 1, further comprising a configurable polarization rotator upstream of the polarization-selective scatterer, for changing a polarization state of at least a portion of the impinging ambient light from the first polarization state to the second polarization state.

5. The polarization-selective diffusive combiner of claim 1, further comprising a focusing element downstream of the polarization-selective scatterer, for forming an image in angular domain from the display light scattered by the polarization-selective scatterer.

6. The polarization-selective diffusive combiner of claim 5, wherein the focusing element is configured to form the image in angular domain from the display light having the second polarization state and to transmit the ambient light having the first polarization state substantially without focusing or defocusing.

7. The polarization-selective diffusive combiner of claim 6, wherein the focusing element comprises a polarization-selective pancake lens.

8. The polarization-selective diffusive combiner of claim 1, wherein the polarization-selective scatterer comprises a Pancharatnam-Berry polymer-stabilized diffuser.

9. A near-eye display comprising:
a polarizer for polarizing impinging ambient light to have a first polarization state;
a polarization-selective scatterer downstream of the polarizer, for receiving and propagating therethrough the ambient light polarized by the polarizer substantially without scattering, while scattering impinging display light having a second polarization state orthogonal to the first polarization state; and
a projector for providing the display light having the second polarization state, wherein the projector is disposed and configured to form an image in linear domain on the polarization-selective scatterer.

10. The near-eye display of claim 9, wherein the first and second polarization states are orthogonal linear polarization states, wherein the polarization-selective scatterer comprises a polymer-stabilized liquid crystal layer comprising liquid crystal molecules dispersed in and aligned by a polymer network extending in a direction perpendicular to a plane of polarization of the first polarization state, whereby the liquid crystal molecules are oriented to have a uniform refractive index for the ambient light having the first polarization state, and a different, spatially varying refractive index for the display light having the second polarization state, for scattering the display light impinging onto the polarization-selective scatterer.

11. The near-eye display of claim 10, wherein the polarization-selective scatterer further comprises first and second transparent electrodes, wherein the polymer-stabilized liquid crystal layer is disposed between the first and second transparent electrodes for electric control of amount of scattering of the display light by the polymer-stabilized liquid crystal layer.

12. The near-eye display of claim 9, wherein the projector is disposed downstream of the polarization-selective scatterer.

13. The near-eye display of claim 9, further comprising a polarization-selective pancake lens downstream of the polarization-selective scatterer, for forming an image in angular domain from the display light scattered by the polarization-selective scatterer, while transmitting the ambient light having the first polarization state substantially without focusing or defocusing.

14. The near-eye display of claim 9, further comprising a configurable polarization rotator upstream of the polarization-selective scatterer and downstream of the polarizer, for changing a polarization state of at least a portion of the impinging ambient light from the first polarization state to the second polarization state.

15. The near-eye display of claim 14, wherein the configurable polarization rotator comprises an array of polarization rotator elements for changing the polarization state of the impinging ambient light in a spatially-variant manner, to form an occluding area upstream of the image in linear domain on the polarization-selective scatterer.

16. The near-eye display of claim 15, further comprising an eye tracker for determining at least one of position or orientation of an eye of a user of the near-eye display, and a controller operably coupled to the eye tracker and the array of polarization rotator elements, and configured to:
use the eye tracker to determine the at least one of the eye position or orientation of the user's eye; and
determine parallax of the occluding area corresponding to an occluding region of the image, in accordance with the at least one of the eye position or orientation;
wherein the controller is configured to operate the array of polarization rotator elements to adjust the occluding area to account for the parallax of the occluding area.

17. A near-eye display comprising:
a first polarizer for polarizing impinging ambient light to have a first polarization state;
a configurable polarization rotator downstream of the first polarizer, for changing a polarization state of at least a portion of the impinging ambient light from the first polarization state to a second polarization state orthogonal to the first polarization state;
a polarization-selective scatterer downstream of the configurable polarization rotator, for receiving and propagating therethrough a portion of the ambient light having the first polarization state substantially without scattering, while scattering light having the second polarization state;
a projector for providing display light having the second polarization state, wherein the projector is disposed downstream of the polarization-selective scatterer and configured to form an image in linear domain on the polarization-selective scatterer; and
a focusing element downstream of the polarization-selective scatterer, for forming an image in angular domain from the display light having the second polarization state scattered by the polarization-selective scatterer towards the focusing element, while transmitting the portion of the ambient light having the first polarization state substantially without focusing or defocusing.

18. The near-eye display of claim 17, further comprising a second polarizer downstream of the configurable polarization rotator and upstream of the polarization-selective scatterer, for attenuating the portion of the impinging ambient light having the second polarization state.

19. The near-eye display of claim 17, further comprising:
an eye tracker for determining at least one of position or orientation of an eye of a user of the near-eye display;
a camera for determining angular brightness distribution of the ambient light; and
a controller operably coupled to the projector, the configurable polarization rotator, the camera, and the eye tracker, and configured to:
use the eye tracker to determine a gaze direction of the user;
use the camera to determine ambient light brightness in the gaze direction;
operate the configurable polarization rotator to dim the ambient light in accordance with the ambient light brightness in the gaze direction; and
operate the projector to provide the display light.

20. The near-eye display of claim 17, wherein the configurable polarization rotator comprises an array of polarization rotator elements for changing the polarization state of the impinging ambient light in a spatially-variant manner, to dim the ambient light in a spatially-variant manner, the near-eye display further comprising:
a camera for determining an angular brightness distribution of the ambient light; and
a controller operably coupled to the projector, the configurable polarization rotator, and the camera, and configured to:
use the camera to determine the angular brightness distribution of the ambient light;
operate the configurable polarization rotator to dim the ambient light in a spatially-variant manner in accordance with the angular brightness distribution of the ambient light; and
operate the projector to provide the display light.

* * * * *